United States Patent [19]
Beitel et al.

[11] Patent Number: 5,119,474
[45] Date of Patent: Jun. 2, 1992

[54] COMPUTER-BASED, AUDIO/VISUAL CREATION AND PRESENTATION SYSTEM AND METHOD

[75] Inventors: Bradley J. Beitel, Woodside, Calif.; Mark S. Bishop; John J. Deacon, both of Austin, Tex.; Robert D. Gordon, Sunnyvale, Calif.; Kenneth B. Smith, Palo Alto, Calif.; Lonnie S. Walling, Ben Lomond, Calif.; Michael D. Wilkes, Austin, Tex.; Peter C. Yanker, Portola Valley, Calif.; Nancy A. Burns, Austin, Tex.; Charles L. Haug, Santa Cruz, Calif.

[73] Assignee: International Business Machines Corp., Armonk, N.Y.

[21] Appl. No.: 728,866

[22] Filed: Jul. 11, 1991

Related U.S. Application Data

[63] Continuation of Ser. No. 367,158, Jun. 16, 1989, abandoned.

[51] Int. Cl.⁵ .............................................. G06F 3/00
[52] U.S. Cl. .................................... 395/154; 395/161
[58] Field of Search ................. 364/518, 521, 523; 434/307, 308, 317, 318, 309, 176, 323, 429; 360/14.3; 358/903

[56] References Cited

U.S. PATENT DOCUMENTS

| | | | |
|---|---|---|---|
| 3,648,249 | 3/1972 | Goldsberry | 340/172.5 |
| 4,315,282 | 2/1982 | Schumacher | 358/107 |
| 4,424,575 | 1/1984 | Clarke et al. | 364/900 |
| 4,445,187 | 4/1984 | Best | 364/521 |
| 4,567,515 | 1/1986 | Schumacher | 358/107 |
| 4,627,001 | 12/1986 | Stapleford et al. | 364/513.5 |
| 4,645,459 | 2/1987 | Graf et al. | 434/43 |
| 4,646,172 | 2/1987 | Lemelson | 360/33.1 |
| 4,660,107 | 4/1987 | Chippendale, Jr. | 360/14.3 |
| 4,689,022 | 8/1987 | Peers et al. | 434/307 |
| 4,712,180 | 12/1987 | Fujiyama et al. | 364/419 |
| 4,746,994 | 5/1988 | Ettlinger | 360/13 |
| 4,893,256 | 1/1990 | Rutherfoord et al. | 364/518 |
| 4,905,094 | 2/1990 | Pocock et al. | 364/518 X |
| 4,931,950 | 6/1990 | Isle et al. | 364/200 |
| 4,933,880 | 6/1990 | Borgendale et al. | 364/518 X |

FOREIGN PATENT DOCUMENTS 2096868 10/1982 United Kingdom ................ 340/706

OTHER PUBLICATIONS

Karen Acerson, *WordPerfect—The Complete Reference*, Osborne McGraw-Hill, 1988, pp. 185–203.
*PC Storyboard*, IBM Corp., Mar. 1985.

*Primary Examiner*—Gary V. Harkcom
*Assistant Examiner*—Michael A. Jaffe
*Attorney, Agent, or Firm*—Perman & Green

[57] ABSTRACT

A user/PC interface system is described which enables the creation and performance of a synchronized audio/visual story on the PC. The interface enables the initial storage of a plurality of visual images. Then, it enables the creation of an audio presentation which includes labels and time indications, certain of which are employed for synchronization purposes. The system is responsive to a label to execute a predetermined command upon the appearance of the label in the audio presentation. The PC is then operated to perform the audio presentation, that performance automatically causing the display of visual images upon the occurrence of labels and time indications. A table-based authoring system is also described for preparation of both the above noted audio and visual presentations. The system relies upon columnar presentations of a tabular form, each column indicating a separate control function (or comment) relating to the audio/visual presentation.

3 Claims, 15 Drawing Sheets

AUDIO FILE NAME: RETAIL1

| PLAY TIME | SOUND | SYNCH LABEL | COMMENTS | SOUND CONTROL METHOD | VOL | TIME |
|---|---|---|---|---|---|---|
| 0000 | | | | | | |
| 0003 | . | INTRO | --------ANCHORS AWAY-------- | | | |
| 0007 | ... | ANCH1 | | | | |
| 0011 | ... | ANCH2 | | | | |
| 0014 | ... | FARE | | | | |
| 0018 | ... | SAIL | | | | |
| 0021 | ... | | | | | |
| 0022 | ... | THRU | | VOLUME | 20 | 2 |
| 0023 | . | FLEET | It's fleetweek in San Francisco | VOLUME | 100 | 0 |
| 0027 | | | The boys are back, heading for shore, | | | |
| 0028 | .. | | and ready to party | | | |
| 0029 | .. | SHORE | | | | |
| 0030 | ... | PARTY | | | | |
| 0032 | .. | | To help you get ready for this | | | |
| 0033 | .. | | special event, | | | |
| 0034 | . | NORD | Nords is having a 2-day sale | | | |
| 0035 | .. | | on all ladies sportsware.... | | | |
| 0036 | .. | | at savings of 20 to 40 % | | | |
| 0042 | . | NEND | | | | |

LIBRARY EDITOR — APPLICATION TABLE

| PROMPT | PROCESS | EDIT | INQUIRE | PRINT | EXIT | HELP |

1
2
3
4
5
6
7
8
9
10
11
12
13
14
15
16
16
17
18
19
20
21
22
23
24
25

APPLICATION: XXXXXXXXXXX

| FR | TYPE | NAME | D: REFERENCE |
|----|------|------|--------------|
|    |      |      |              |

(F=FILE, R=REFERENCED FILE, D=DEFAULT DRIVE)

FIG. 3

LIBRARY EDITOR —
    APPLICATION ACTION BAR

LIBRARY EDITOR –

LIBRARY TABLE

| TYPE | D: | NAME | |
|---|---|---|---|
| APPLIC | | DEMO1 | PRESENTS CURRENT PRODUCT LINE |
| APPLIC | | DEMO2 | PRESENTS PLANNED NEW PRODUCTS |
| APPLIC | | MYAUDIO | GENERAL PURPOSE MUSIC |
| APPLIC | | MYIMAGES | GENERAL PURPOSE PICTURES |
| APPLIC | E: | DEMO1BU | BACKUP |
| APPLIC | E: | DEMO2BU | BACKUP |

FIG. 7

APPLICATION TABLE

| FR | TYPE | NAME | |
|---|---|---|---|
| F | IMAGE | MODEL1 | ENTRY COST |
| F | IMAGE | MODEL2 | INTERMEDIATE |
| | IMAGE | MODEL3 | (IMAGE NOT YET OBTAINED) |
| F | AUDIO | OPENING | DIFFERENTIATE THE MODELS |
| F | AUDIO | CLOSING | SUMMARIZE ADVANTAGES |
| F | STORY | DEMO1 | SHORT DEMO VERSION |

FIG. 8

APPLICATION TABLE

| FR | TYPE | NAME | | D: | REFERENCE |
|---|---|---|---|---|---|
| R | IMAGE | SKIING | COUPLE ON A LIFT CHAIR | E: | IMAGES4 |
| R | IMAGE | BIKING | WOMAN IN RACING SUIT | E: | IMAGES4 |
| R | IMAGE | JOGGING | MAN ON A TRACK | E: | IMAGES4 |
| F | AUDIO | INTRO1 | WELCOMING SPEECH | | |
| R | AUDIO | STARWARS | OPENING THEME | F: | AUDIO3 |
| R | AUDIO | PEANUTS | PIANO RENDITION | F: | AUDIO3 |
| R | STORY | DEMO1 | MAIN CONTROLLING STORY | | DEMO1 |

FIG. 9

AUDIO EDITOR TABLE

PROMPT | AUDIO | EDIT | MIX | CONTROLS | PRINT | FILE | EXIT | HELP

AUDIO A: XXXXXXXX..............(X)   AUDIO B: XXXXXXXX..............(X)

| PLAY TIME | SOUND | SYNCH LABEL | COMMENTS | SOUND CONTROL METHOD | VOL | TIME |
|---|---|---|---|---|---|---|
| | | | 22 | | | |

FIG. 10

AUDIO FILE NAME: RETAIL1

| PLAY TIME | SOUND | SYNCH LABEL | COMMENTS | SOUND CONTROL METHOD | VOL | TIME |
|---|---|---|---|---|---|---|
| 0000 | | | --------ANCHORS AWAY-------- | | | |
| 0003 | . | INTRO | | | | |
| 0007 | ... | ANCH1 | | | | |
| 0011 | ... | ANCH2 | | | | |
| 0014 | ... | FARE | | | | |
| 0018 | ... | SAIL | | | | |
| 0021 | ... | | | | | |
| 0022 | ... | THRU | | VOLUME | 20 | 2 |
| 0023 | . | FLEET | It's fleetweek in San Francisco | VOLUME | 100 | 0 |
| 0027 | | | The boys are back, heading for shore, | | | |
| 0028 | .. | | and ready to party | | | |
| 0029 | .. | SHORE | | | | |
| 0030 | ... | PARTY | | | | |
| 0032 | .. | | To help you get ready for this | | | |
| 0033 | .. | | special event, | | | |
| 0034 | . | NORD | Nords is having a 2-day sale | | | |
| 0035 | .. | | on all ladies sportswore.... | | | |
| 0036 | .. | | at savings of 20 to 40 % | | | |
| 0042 | . | NEND | | | | |

FIG. 14

AUDIO EDITOR – ACTION BAR

| PROMPT | AUDIO | EDIT |
|---|---|---|

METHOD

VOLUME

| VOL | TIME |
|---|---|
| 100 % | 0 SEC. |
| 95 % | .5 SEC. |
| 90 % | 1 SEC. |
| 85 % | 2 SEC. |
| 80 % | 4 SEC. |
| 75 % | 5 SEC. |
| 50 % | 8 SEC. |
| 0 % | 10 SEC. |

| | |
|---|---|
| PLAY | ALT Y |
| PLAY AGAIN | ALT A |
| PLAY A BLOCK | ALT B |
| PLAY FROM BEGINNING | ALT G |
| RECORD | ALT R |
| RERECORD | ALT O |
| AUTO-SCROLLING... | ALT S |

| | |
|---|---|
| UNDO | ALT U |
| COPY | ALT C |
| LIFT | ALT L |
| PASTE | ALT P |
| INSERT LINES | ALT I |
| DELETE LINES | ALT D |
| ZOOM... | ALT Z |

FIG. 11

| MIX | CONTROLS | PRINT |
|---|---|---|

| | |
|---|---|
| CURSOR A/B... | ALT + |
| VIEW... | VLT V |
| BACKGROUND PLAY | ALT K |
| MARK SYNCH POINT | ALT M |
| PERMANENT SOUND MIX.. | |

| |
|---|
| MASTER VOLUME/BALANCE... |
| SOUND CONTROL... |
| SOURCE LINE... |
| MONITOR RECORDING... |

| |
|---|
| PRINT |
| PRINT A BLOCK |

FIG. 12

| FILE | EXIT | HELP |
|---|---|---|

| | |
|---|---|
| SAVE ALL | ALT F4 |
| SAVE A | |
| SAVE B | |
| CREATE NEW A... | |
| CREATE NEW B... | |
| GET A | |
| GET B | |

| | |
|---|---|
| SAVE ALL AND EXIT | ALT F3 |
| SAVE A AND EXIT | |
| SAVE B AND EXIT | |
| EXIT WITHOUT SAVING | F3 |
| RESUME | ESC |

| | |
|---|---|
| AUDIO OVERVIEW | |
| HELP INDEX | F11 |
| HELP CONTENTS | SHIFT F11 |
| SPECIAL KEYS... | |

FIG. 13

STORY EDITOR TABLE #1

| | | | | | | | | |
|---|---|---|---|---|---|---|---|---|
| STATEMENT | SCREEN ---><br>SOUND ---> | METHOD<br>METHOD | DIR<br>CHANNL | LINE<br>VOL | TIME<br>TIME | WAIT<br>WAIT | SIZE<br>SIZE |

PROMPT   TELL   EDIT   VIEW   PRINT   FILE   EXIT   HELP

STORY: XXXXXXX........                                       nnn of nnn

FIG. 17

STORY EDITOR - TABLE #2

PROMPT   TELL   EDIT   VIEW   PRINT   FILE   EXIT   HELP

STORY: XXXXXXX........                                       nnn of nnn

| STATEMENT | SCREEN--><br>SOUND--> | METHOD<br>METHOD | SIZE<br>SIZE | IMAGE X,Y<br>SOUND BEG | WDTH, HGHT<br>SOUND END | SCREEN X,Y |
|---|---|---|---|---|---|---|

FIG. 18

| METHOD |
|---|
| CHECKER |
| CRUSH |
| DIAG |
| EXPLODE |
| FADE |
| FADEIN |
| FADEOUT |
| MOVE |
| MOVEON |
| MOVEOFF |
| PUSH |
| REPLACE |
| SPLIT |
| STRIPES |
| WEAVE |

FIG. 19

| DIR |
|---|
| UP |
| DOWN |
| RIGHT |
| LEFT |
| IN_H |
| IN_V |
| OUT_H |
| OUT_V |

FIG. 20

| LINE |
|---|
| BKGRND |
| BLACK |
| BLUE |
| CYAN |
| GREEN |
| MAGENT |
| RED |
| WHITE |
| YELLOW |
| NONE |

FIG. 21

| TIME | |
|---|---|
| FAST | (0) |
| MEDIUM | (2.5) |
| SLOW | (5) |
| 0 | |
| 0.5 | |
| 1 | |
| 2 | |
| 4 | |
| 8 | |

FIG. 22

| WAIT |
|---|
| KEY |
| 0 |
| 0.5 |
| 1 |
| 2 |
| 4 |
| 8 |
| INPUT |
| TRIGGER |
| CHANNEL A... |
| CHANNEL B... |

FIG. 23

| SIZE |
|---|
| FULL |
| PART |

FIG. 24

| IMAGE X,Y | |
|---|---|
| 00.0 | 00.0 |
| 25.0 | 25.0 |
| 50.0 | 50.0 |
| 75.0 | 75.0 |

FIG. 25

| WDTH,HGHT | |
|---|---|
| 25.0 | 25.0 |
| 50.0 | 50.0 |
| 75.0 | 75.0 |
| 100 | 100 |

FIG. 26

| SCREEN X,Y | |
|---|---|
| 00.0 | 00.0 |
| 25.0 | 25.0 |
| 50.0 | 50.0 |
| 75.0 | 75.0 |
| SAME | SAME |

FIG. 27

STORY EDITOR — TABLE PROMPTS (2) — FOR SCRREN TYPE LINES

| METHOD |
|---|
| FADEIN |
| FADE |
| FADEOUT |

FIG. 28

| CHANNL |
|---|
| A |
| B |

FIG. 29

| VOL |
|---|
| 0 |
| 20 |
| 40 |
| 60 |
| 80 |
| 100 |

FIG. 30

| TIME |
|---|
| FAST |
| MEDIUM |
| SLOW |
| 0 |
| 0.5 |
| 1 |
| 2 |
| 4 |
| 8 |

FIG. 31

| WAIT |
|---|
| KEY |
| 0 |
| 0.5 |
| 1 |
| 2 |
| 4 |
| 8 |
| INPUT |
| TRIGGER |
| CHANNEL A... |
| CHANNEL B... |

FIG. 32

| SIZE |
|---|
| FULL |
| PART |

FIG. 33

| SOUND BEG |
|---|
| ...LISTS |
| AUDIO |
| SYNCH |
| LABELS |

FIG. 34

| SOUND END |
|---|
| ...LISTS |
| AUDIO |
| SYNCH |
| LABELS |

FIG. 35

STORY EDITOR - ACTION BAR

STORY EDITOR
  TABLE PROMPTS

| PROMPT (AVA STATEMENT) |
|---|
| ALL OBJECTS... |
| STORY OBJECTS... |
| IMAGE OBJECTS... |
| AUDIO OBJECTS... |
| AVA FUNCTIONS... |
| AVA COMMANDS... |

FIG. 40

AVA FUNCTIONS

| ARG( | /* number option |
| ASK() | |
| COMPARE( | /* FIELD,FIELD,pad |
| DATE( | /* option |
| DELSTR( | /* FIELD,pos,len |
| DEIRECTORY( | /* directory |
| FIND( | /* FIELD,TEXT |
| FINISH( | /* FILENAME |
| HEND() | |
| HRUN( | /* FUNCTION |
| HSEND( | /* CODE,MESSAGE |
| HSETTING() | |
| HSTART( | /* APPLICATION |
| INSERT( | /* TEXT,FIELD,pos,len,pad |
| LASTPOS( | /* TEXT,FIELD,pos |
| LENGTH( | /* FIELD |
| MAX( | /* NUMBER,number |
| MEMORY() | |
| MIN( | /* NUMBER, number |
| OVERLAY( | /* TEXT,FIELD,pos,len,pad |
| POS( | /* TEXT,FIELD,pos |
| READ( | /* FILENAME,offset |
| SEEK( | /* FILENAME,offset |
| SIZE( | /* FILENAME |
| SUBSTR( | /* FIELD,pos,len,pad |
| TIME() | |
| TRUNC( | /* FIELD,decimals |
| WRITE( | /* FILENAME,FIELD,option |

FIG. 41

AVA COMMANDS

| CALL |
|---|
| CLEAR |
| COLOR |
| DO |
| DROP |
| ELSE |
| END |
| EXIT |
| IF |
| INPUT |
| ITERATE |
| LEAVE |
| LOAD |
| NOP |
| PARSE |
| PASTE |
| PLAY |
| PROCEDURE |
| RELEASE |
| RETURN |
| SAY |
| SELECT |
| SIGNAL |
| SHOW |
| TELL |
| THEN |
| TRACE |
| UPPER |
| UNTIL |
| WAIT |
| WHEN |
| WHILE |

STORY FILE NAME: RETAIL1

| LIN NUM | STATEMENT | | SCREEN---><br>SOUND---> | METHOD | DIR<br>CHANNL | LINE<br>VOL | TIME | THEN<br>WAIT | SIZE | SRC X,Y<br>SOUND BEG | WDTH,HGHT<br>SOUND END | DST X,Y |
|---|---|---|---|---|---|---|---|---|---|---|---|---|
| 1 | /* | RETAIL2 SHOW (approx. 2 minutes shows a sample store kiosk show... | | | | | | | | | | |
| 2 | /* | | | | | | | | | | | |
| 3 | /* | | | | | | | | | | | |
| ... | | | | | | | | | | | | |
| 11 | show | INTRO | | FADE | RIGHT | | 0.5 | 0 | FULL | | | |
| 12 | load | SAILORS | | | | | | | | | | |
| 13 | wait key | | | | | | | | | | | |
| 14 | | | | | | | | | | | | |
| 15 | | | | | | | | | | | | |
| 16 | /* | anchors away begins, then show navy series, then logo.... | | | | | | | | | | |
| 17 | /* | | | | | | | | | | | |
| 18 | /* | | | | | | | | | | | |
| 19 | play | RETAIL1 | | | | | | | | | | |
| 20 | show | ALLBLACK | | FADE | A | 100 | 0 | A 2 | FULL | | | |
| 21 | show | NAVYHAT | | CHECKER | A | | 2 | 0.5 | FULL | | | |
| 22 | show | SAILORS | | EXPLODE | IN_V | RED | -2 | 1 | | | | |
| 23 | play vol | | | | A | 0 | 6 | A 21 | | | | |
| 24 | play vol | | | | A | 70 | 2 | A 23 | | | | |
| 25 | show | BEACH3 | | CRUSH | IN_V | BLUE | 0 | 0 | | | | |
| 26 | load | LOGO | | | | | 2 | 1 | | | | |
| 27 | clear | black | | STRIPES | IN_V | NONE | 0.8 | A NORD | | | | |
| 28 | | | | | | | | | | | | |
| 29 | show | LOGO | /*logo | CRUSH | OUT_H | NONE | 1 | 1.4 | PART | 9.5,56.2 | 82.0,38.7 | |
| 30 | show | | /*date | SPLIT | OUT_V | YELLOW | 0.7 | 1.4 | PART | 16.7,13.7 | 66.7, 9.5 | |
| 31 | show | | /*time | SPLIT | | 0 | 0.7 | 1.4 | PART | 21.7,23.3 | 56.7, 8.7 | |
| 32 | show | | /*pct. | SPLIT | | | 0.7 | 1.4 | PART | 29.8,32.5 | 37.1, 8.7 | SAME,SAME |

COMPUTER-BASED, AUDIO/VISUAL CREATION AND PRESENTATION SYSTEM AND METHOD

This is a continuation of copending application Ser. No. 07/367,158 filed on June 16, 1989, now abandoned.

FIELD OF THE INVENTION

This invention relates to computer-based systems for producing audio/visual presentations, and more particularly, to a software-supported user interface for enabling a personal computer to produce and display an integrated audio/visual presentation.

BACKGROUND OF THE INVENTION

As personal computers (PCs) have improved in processing capability, various application programs have been developed which enable the creation and display of audio/visual presentations. In the mid 1980's, the IBM Corporation marketed a PC application program entitled: "PC Storyboard" which enabled the preparation and display of color presentations on an IBM PC. The PC Storyboard software was comprised of four program segments. A first segment, entitled: "Picture Maker", enabled the creation and modification of pictures in medium resolution graphics. Picture Maker included commands to write text, draw figures, generate charts and to cut and paste images between pictures. A second segment, "Picture Taker", was employed to capture picture images of scenes from other PC application programs. "Story Editor", was a third segment which enabled the PC user to organize pictures into presentations (stories). It provided for the selection of a variety of picture-to-picture transition methods that allowed one picture to dissolve into another. Variables such as display times, colors and whether the picture would be developed as a full picture or as a series of partial pictures, were also enabled by this software. Storyboard also included a segment entitled: "Story Tell", which enabled the presentation of stories assembled by the other software segments.

While Storyboard was, for its time, a remarkable product for the PC, it lacked a number of capabilities. It was essentially a visual presentation assembler and presenter; it lacked any significant capability for audio presentation assembly; for synchronization of an audio presentation with the visual presentation; for interspersing during the presentation, commands which enabled logical and data processing interactions between the viewer and the PC; etc.

Recently, the increased use of windows, pull-downs, advanced cursor-selection techniques and other display-oriented, user interface instrumentalities have come into favor. These enable a PC user to directly interface with a PC's software and to control it largely from cursor-controlled screen selections. Substantial capability, color presentation systems with synchronized audio have not, to the Inventor's knowledge been made available for the PC market.

In addition to PC Storyboard, other prior art has provided audio/visual, computer-based presentation capabilities. For instance, in U.S. Pat. No. 4,712,180 to Fujiyama et al, a computer-assisted instruction system is described wherein audio and pedagogy information are compiled to produce a recording medium with an integrated mode of presentation. Various embodiments are described for integrating the audio and non-audio components of the presentation. In U.S. Pat. No. 4,645,459 to Graf et al, the use is described of a library of images to produce improved quality "real-world" images for computer imagery. Lemelson, in U.S. Pat. No. 4,646,172 describes, a video presentation system wherein audio and video segments are combined to produce an integrated presentation. None of the above references teach a user-friendly interface which enables direct and simple methods for compilation of the presentations.

In U.S. Pat. No. 4,746,994 to Ettlinger, an editing system is described wherein selected film segments may be spliced independent of picture and sound track sources and timing. The system provides a graphically arranged representation of the script of the work being edited, thus permitting the editor to preview and select segments of different "takes". This system attacks considerably different problems than those encountered in computer-based audio/visual presentations.

Accordingly, it is an object of this invention to provide a computer-based audio/visual assembly and presentation system which exhibits visual presentations with synchronized audio.

It is a further object of this invention to provide an audio/visual assembly and presentation system which enables interactive processing with a user during the presentation and which is adapted to run on a PC.

It is another object of this invention to provide an audio/visual synchronized presentation system for a PC wherein intelligent interfaces on the PC screen enable a user to easily employ the system.

SUMMARY OF THE INVENTION

A user/PC interface is described which enables the creation and performance of a synchronized audio/visual story on the PC. The interface initially enables the storage of a plurality of visual images. Then, it enables the creation of an audio presentation which includes labels and time indications, certain of which are employed for synchronization purposes. Means are provided in the computer which are responsive to a label to execute a predetermined command upon the appearance of a label in the audio presentation. The computer/software system is then operated to perform the audio presentation, that performance automatically causing the display of visual images upon the occurrence of labels and time indications.

An improved, table-based authoring system is also described for preparation of both the above noted audio and visual presentations. The system relies upon columnar presentations of a tabular form, each column indicating a separate control function, comment, or other free form statement relating to the audio/visual presentation.

BRIEF DESCRIPTION OF THE DRAWINGS

FIG. 3 shows a library application table screen used by the invention.

FIG. 7 illustrates a screen presentation of a first level library table showing various applications available to the audio/visual system.

FIG. 8 is a display of a "bill of materials" which appears on the screen when one of the applications shown in FIG. 7 is selected.

FIG. 9 is another "bill of materials" displayed on the screen and indicates the use of reference addressing.

FIG. 10 is a screen exhibiting the audio editor table.

FIG. 11 is a showing of the menus which appear when either the Prompt, Audio or Edit indications in the "action bar" of FIG. 10 are selected.

FIG. 12 is a showing of the menus which appear when either the Mix, Controls or Print indications in the "action bar" of FIG. 10 are selected.

FIG. 13 is a showing of the menus which appear when either the File, Exit or Help indications in the "action bar" of FIG. 10 are selected.

FIG. 14 is a showing of an audio editor table which has been compiled to present an audio piece.

FIG. 17 is a screen showing of a story editor table used with this invention.

FIG. 18 is a showing of the screen of FIG. 17 with the five rightmost columns of the story editor table replaced with additional category columns.

FIGS. 19-27 indicate the screen type line menus which appear for each column of the story editor table of FIG. 14.

FIGS. 28-35 indicate sound type line menus which appear for each column of the story editor table of FIG. 14.

FIG. 40 shows prompt tables which appear when the Prompt indication is selected on the story editor "action bar".

FIG. 41 shows AVA (audio/visual authoring language) functions which appear when the AVA functions line in FIG. 40 is selected.

FIG. 42 shows the AVA commands which appear when the AVA commands line in FIG. 40 is selected.

FIG. 43 is a showing of a story editor print-out illustrating an audio/visual presentation.

DETAILED DESCRIPTION OF THE INVENTION

Figure 44:
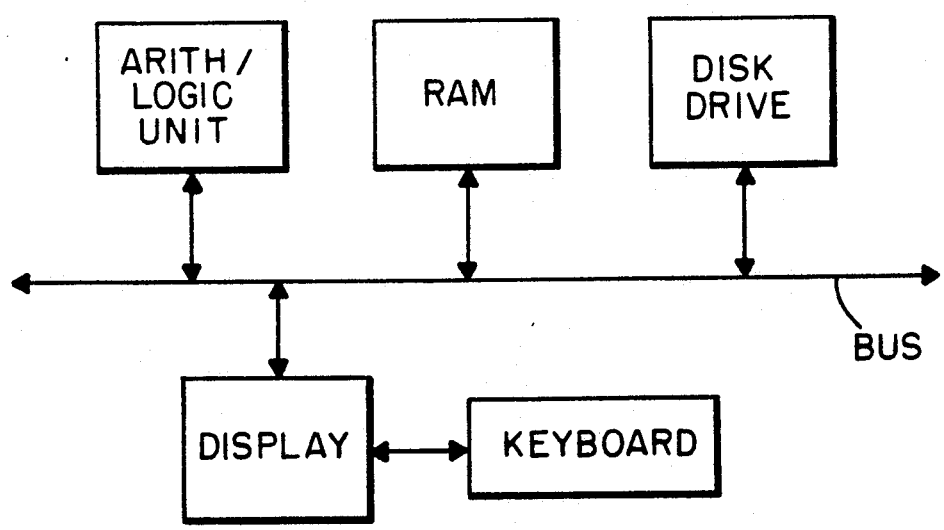
FIG. 44 is a block diagram of a Personal Computer for implementing the invention.

It is to be understood initially that the invention may be configured from either software or firmware, either of which may be adapted to run on a PC, such as the IBM PS/2. As is known, most modern PCs are constructed to employ a bus structure with PC/subassembly communications taking place, in the main, over the bus or buses. Characteristically, a graphics capable PC is provided with an arithmetic/logic unit, random access memory, various disk drives for storing quantities of readily available data, and a color display including a keyboard. The display is adapted to show an image or images, along with a cursor (or cursors) which enable user selection of various software subroutines. All of the aforementioned structure is conventional and knowledge of its operation is assumed in the succeeding description. FIG. 44 shows a block diagram of a PC as above described.

Figure 1:
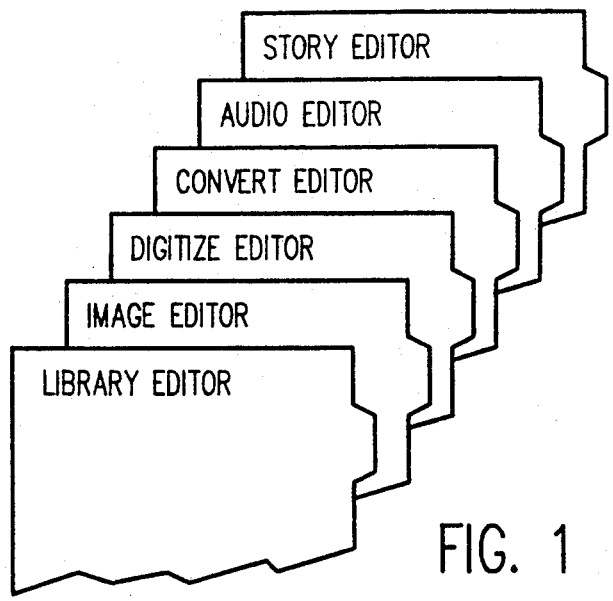
FIG. 1 is an illustration of the software segments of the invention.

Referring now to FIG. 1, the six major software segments of the invention are schematically shown. The overall program includes a library editor; image editor; digitize editor; convert editor; audio editor; and a story editor. During the course of the description, the digitize and convert editors will only be briefly referred to, whereas the others will be discussed in detail.

In brief, the library editor manages the retrieval, processing and storing of audio-visual "objects" (i.e., an "object" is an image, audio file or story used in the creation of an audio/visual presentation). The image editor is primarily used to add text and draw graphics onto images; to define special field types such as input or cursor actuation fields, and to do other image manipulations such as resizing or rotating. The digitize editor is used for converting video camera (analog) input images into computer digital form. These images are then stored as files in the PC where they become available for use in the audio/visual operation. The convert editor is used to modify images captured by scanners or other image digitizing systems and to convert them into a form usable in the audio/visual system of this invention. The audio editor enables the recording (digitizing) and editing of sound. It also enables the insertion of time and other signals which are subsequently used to control the presentation of the story. The story editor assembles audio/visual presentations (called stories) and pulls together all of the data from the keyboard, files and various editors to present a completely synchronized, audio/visual presentation.

LIBRARY EDITOR

Each time the software system of this invention is initially operated, library editor is automatically invoked as the first editor accessed. The library editor provides access information on all objects within the software segments and their paths. The user selects a particular audio/visual object to work with (such as an image or a story), and then selects the type of processing to perform on the object (such as edit, digitize, convert, etc.). These choices automatically determine which of the other editors is to be invoked. Thus, the other editors are invoked according to the object and task selected rather than by an explicit editor name. The selected object is automatically retrieved for the invoked editor at the same time the editor is activated, so that the object is present for use as soon as the editor comes on-line.

At the conclusion of processing by a respective editor, control returns to the library editor, with any object changes now saved to disk. Once back in the library editor, the user can select either another object or object processing or can exit to other operations. Thus, movement to and from editors is normally routed through the library editor. In essence, the library editor is the "main menu" from where branching to all individual object editors occurs.

All objects, such as images, stories and audio files are listed in the library editor's displays. It is to be remembered that it is these object lists that are used by the system to cause various object editors to be invoked and it is the paths to the objects indicated in these lists that are used to control where objects are retrieved from and saved to.

While the library within the library editor contains information about various directories and objects, (e.g., type, name, description and path), it does not contain the directories or objects themselves. It essentially is an index which points to an object, wherever that object may reside within the system.

The term "application" will be used hereinbelow and it is meant to refer to a collection of objects grouped together in the library in a way that is meaningful to the user. An application may be a series of objects usable for a product presentation, an advertising message, or another audio/visual presentation. The application will have a name and be listed and accessed by that name. Furthermore, each application will have a secondary list embedded in it which, in addition to indicating the particular application, lists all of the various objects which are part of the application (i.e., a "bill of materials" for the application).

In the discussion below, a plurality of display screens will be described which enable the principal modes of interaction between the user and the system. Each screen presents a table, window, pull-down, action bar or combination thereof which provides for information feedback from the system to the user and vice-versa. Screens are generally provided with a plurality of cursor kinds (e.g., highlight bars, underlines, emphasis marks, etc.) to enable a user to know which portion of a screen is enabled for an input. Some cursor kinds automatically move on the screen (e.g., while a software segment is "playing",) or are moved by the user's actuation of a mouse, keyboard keys (e.g., right, left, up, down arrows, tab key, backspace, etc.) or other cursor control instrumentalities.

Figure 2:
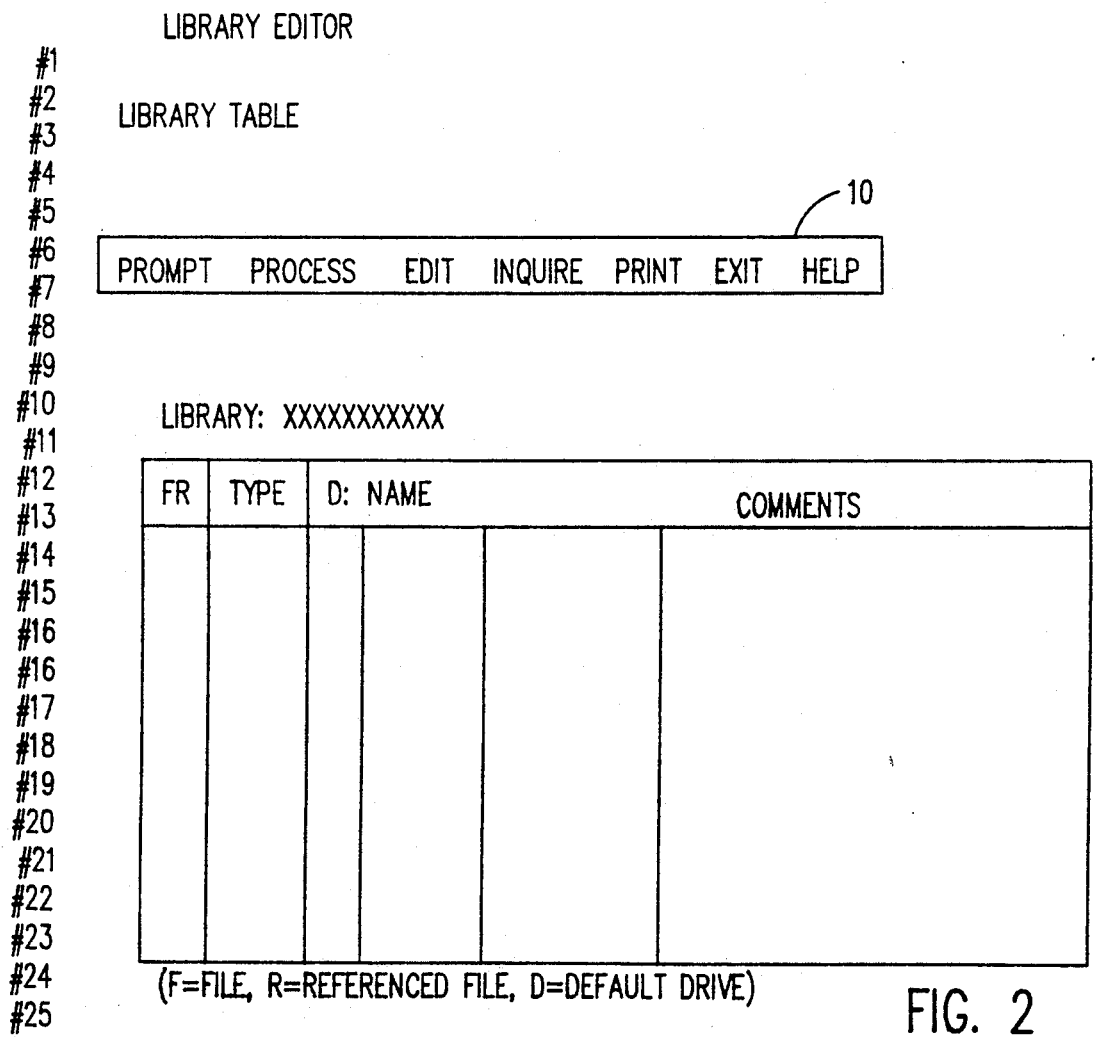
FIG. 2 shows a library table screen used by the invention.

Turning now to FIG. 2, a first level library editor screen entitled "library table" is illustrated. This table lists the various applications and their names that are contained within the library editor. It forms the highest level directory to all subsidiary directories related to the various listed applications. An "action bar" 10 appears on line 1 of the screen and contains a number of action indications. The placement of a cursor at any listed action indication will invoke a pull-down with a listing of the available functions pertaining to the chosen action.

On line 3 of the screen, the term "library" indicates that this screen may be accessed by typing "library" followed by its particular name. Since the library editor can contain hundreds of listed applications, the combination of "library" with an application's name provides the system with the input necessary to identify the correct library screen. Assuming that the PC operates with a disk operating system (DOS), each library is physically one DOS directory.

The library table of FIG. 2 comprises a plurality of columns. The left-most column (FR) will have either an F or an R adjacent a line. F indicates the application is physically resident in the currently connected file. R indicates that the named file is located in another file not connected at the moment. The next column to the right "Type", defines the kind of file indicated on the line. In most cases the indication will be "application". The next column (headed by D:) indicates, if a D is present in a line, that the file is on a drive not presently on-line. The Name column indicates the assigned name of the application and the Comments column includes any descriptive comments regarding the file as well as a path indication if an R is present in the left-most column.

In FIG. 7, an example of a library table is shown with certain of its columns filled in. Note that all of the listed files are application files; that the last two application files are housed on drive e (which is not on-line); that the names of the files are as indicated; and that the adjacent comments describe, briefly, the subject matter of each application. For instance, Demo 1 presents the "current product line" as an audio/visual presentation.

Each line within a library table indicates the name and gross contents of the application. In order to determine the detailed contents of an application, the "application" table associated with the particular application must be accessed. This action will bring up for view, a "bill of materials" which lists all of the objects associated with the application.

An application table may be selected by placing the cursor on the line of the library table where it appears and selecting, from action bar 10, a processing action to perform (e.g., edit). When an application is selected, the system retrieves an existing application from the file (or enables the creation of a new one, if that is desired) and then displays its corresponding application table screen which lists all images, stories, audio files, etc. associated with the application.

Turning to FIG. 3, a representative application table is shown. This table, as aforestated, displays the contents of one specific application. Like the library table, the application table contains on its first line, an action bar 10 containing a number of indicated actions which, when invoked, cause the display of detailed pull-downs. Line three contains the indication "application" along with the name of the application. The left most table column (FR) indicates whither the object listed on the line is physically resident in this application. An F indicates the object is resident in the application file. If an R (for "reference") is shown, it indicates that the object listed is not physically resident in this application file. A reference-to where that object is actually stored is found in the right-most columns of the table (i.e., D: Reference). There is inserted path information pointing to the location where the object is stored. A blank in the FR column signifies the line is a comment-only type line.

The Type column denotes whether the object is an image, audio, story or other object. The Name column contains a user-assigned name for the object. The column to the right of the Name column includes comments which describe something about the object to enable the user to recall its substance. For example, as shown in FIG. 8, an exemplary application table is illustrated having three image objects, two audio objects and one story object. Each image object has an assigned name (e.g. "Model 1") which enables that object file to be identified. A comment next to each object listing explains something about the object.

It is from an application table screen that access to the object editors occurs. While not shown, a cursor is present on the screen and is free to roam, under user control, from line to line and scroll from page to page.

To process an existing object, the cursor is placed on the line for the object and an action from the action bar is invoked. This results in display of a pull down listing of available functions with the action classification. If then, a cursor is placed next to a function (e.g., "edit file") and a selection made, the proper editor program segment is accessed. For instance, the "edit file" action invokes the audio editor for an audio object, image editor for an image object, and story editor for a story object.

Figure 4:
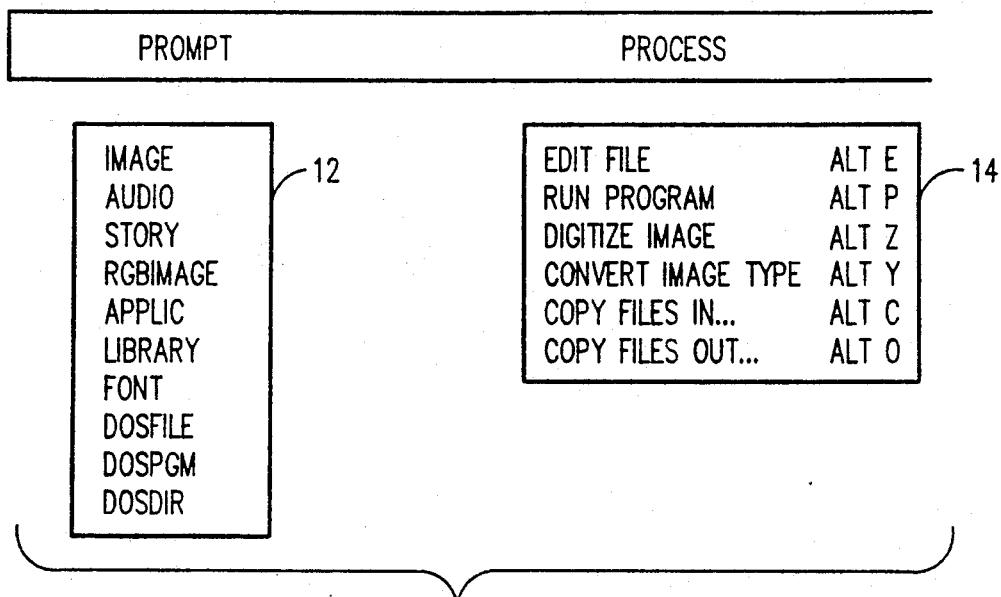
FIG. 4 shows menus which are displayed when either Prompt or Process actions on a screen "action bar" are selected on a library application screen.
Figure 5:
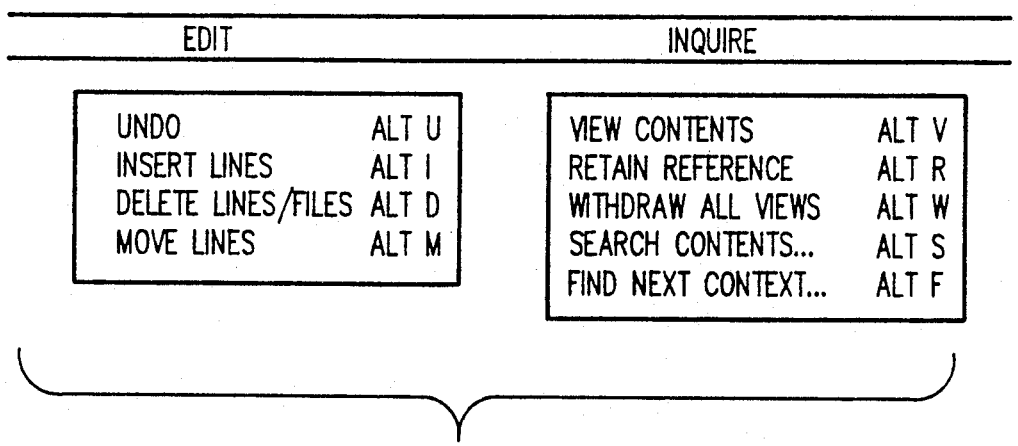
FIG. 5 shows menus which are displayed when either Edit or Inquire actions on a screen "action bar" are selected on a library application screen.
Figure 6:
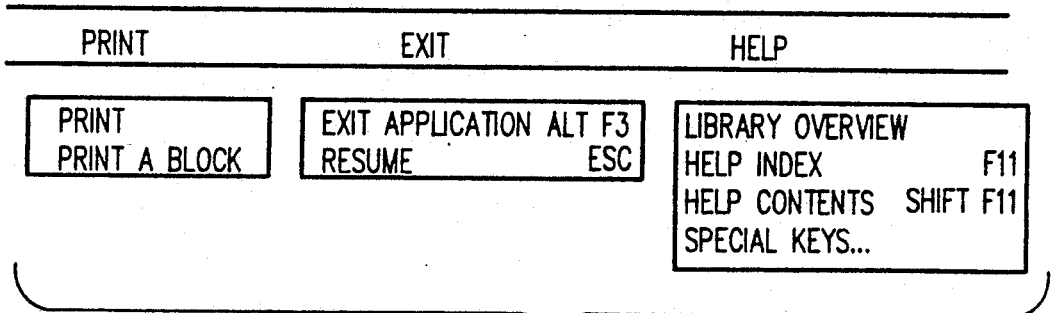
FIG. 6 shows the menus which are displayed when either Print, Exit or Help actions on a screen "action bar" are selected on a library application screen.

Turning to FIGS. 4-6, the pull-downs (and related functions) which result from the invoking of one or more actions in action bar 10 are illustrated. As shown in FIG. 4, a cursor indication placed at the Prompt location in action bar 10 and a user actuation of a Prompt-associated keystroke (e.g. by typing P) causes pull-down 12 to appear. This pull-down both shows and enables the available entries which can be made in the "type" column at a selected line in an application table.

Placing the cursor at the Process location in the action bar enables pull-down 14 to be displayed. If the cursor is then placed next to the "edit file" line and the ALT and E keys depressed by the user, an appropriate editor is selected as above described. This, then, enables the particular object listed in the application table to be appropriately altered by one of the editor program segments. The "run program" line is particularly related to a listed story object. The remaining listings shown in pull-down 14 are self-explanatory.

In FIG. 5, the Edit action pull-down is shown as well as the Inquire action pull-down. In FIG. 6, the Print, Exit and Help pull-downs are shown. Each of the lines within each of the pull-downs defines a particular task which is enabled upon the appropriate positioning of a cursor and selection of the task. For instance, in the Edit pull-down, placing a cursor next to the "undo" line and user depression of an -Enter key removes the last edit change that affected the application table screen, such as an insert or a move.

Referring now to FIG. 9, an application table is shown having a number of referenced objects listed therein. As aforestated, references allow objects to be associated with an application without physically residing in the same directory. For example, assume a user keeps all audio music stored in a single application/directory such as, MYAUDIO. This is attractive because all music is in one place for convenient access, maintenance and backup. If now, for various demonstration applications, different pieces of music are desired, there are a number of approaches possible to link the demonstration and the music together. The music could be physically copied into the different directories. This would be unacceptable as much duplicate storage and multiple copies would be required. Alternatively, the different demonstration stories could place specific path information with every "play" type statement. This would avoid storage duplication since the demonstration applications would still be using the original audio versions. However, if any software path change needed to be made to the MYAUDIO file (e.g., if it was placed on a different drive), all path entries on "play" statements related to the music would require finding and changing.

References in this invention work around these drawbacks by allowing an object to be listed in an application as if it were physically there. Path information is provided in the right-most column of the application table and redirects access to the application and file where the object is actually physically located. In FIG. 9, examples of referenced paths are shown. The referenced object, SKIING is listed as an image object. This enables any "show" statement in a story working from this application to use SKIING as an object name without requiring any special path designation—exactly as is done for any object physically stored in this application such as the file INTRO 1. At story run-time, when a play statement is encountered with SKIING, the program automatically causes the path "e:IMAGES 4" to be searched for the image object SKIING. Hence, while SKIING both can be played and edited when working from this application, the actual physical file is continually retrieved from and stored in the referenced application/directory e:IMAGES 4. Thus, only one path designation need be maintained for SKIING—the one on the object line in the application table—where SKIING is actually resident.

When applications being referenced all reside on-line, the benefit from the reference procedure is that duplicate storage is not needed—only one copy of an object need be maintained and other applications outside of the one owning the object can access it by pointing to it (referencing it). Another benefit is that these path references do not have to be repetitively entered and spread throughout for each object. Each application needs just one reference (path designation) per each object referenced. Thus, this enables one object copy to be accessed by all.

Once a user has fully assembled all of the objects required to produce an audio/visual presentation, the next action required is to assemble the audio portion of the presentation. This is accomplished in the audio editor.

AUDIO EDITOR

The audio editor is used to record, digitize, and edit sound. All work done with the audio editor is done through a columnar table displayed on the PC screen and shown in FIG. 10. Sound is handled in time lines of one second increments. A volume level is indicated for each sound line. Each line may also contain comments for annotation, sound controls for volume adjustment and labels for story synchronization. It is also possible to have comment lines in the table without any accompanying sound. Such comment lines may be used to document full audio scripts. Edit action such as copy, lift, paste, insert and delete allow audio to be cut, reordered and spliced via software controls. A zoom to tenths of a second facilitates extremely fine editing, if desired. As with the previously table screens, the audio editor table of FIG. 10 includes an action bar 20 which is used to invoke various pull-downs and associated subroutines. The name of the current audio object in process is displayed following the audio A label. Audio B provides for a second channel of audio, and if in use displays the audio object B name. During the operation of the audio editor table, a background color cursor 22 is employed and is enabled to scroll up or down in accordance with user actuated keyboard controls. During playing and recording, cursor 22 extends across the full width of the table and keeps pace, on a line for line basis, as music is recorded or played. At other times during the operation, only a portion of cursor 22 is utilized to indicate the particular column enabled for input from the user.

In the audio editor table, the left-most column "Playtime" contains a series of numbers from 0000 to 9999 to prepresent which second of sound is indicated. Seconds are numbered consecutively for all sound lines. Thus, any insertion or deletion of sound causes an appropriate renumbering of the column. In essence, the column gives an indication, from the beginning of Playtime to the end of Playtime, of the total number of seconds expended and, more particularly, an indication of each individual second. A line having no sound associated with it is a "comment only" line and 3 dashes are displayed in the Playtime field.

The "Sound" column field contains a plurality of squares sequenced left to right indicating the volume level of this sound second. Each square represents an additional level of volume. By referring to FIG. 14, examples of these squares in the sound column can be seen. The next column ("Synch Label") accepts a label which is adapted to be referenced in the story editor table (to be described below) as an audio point to synchronize on. In essence, a synch label may be a fundamentally fixed audio point to synchronize to, as contrasted to time values which are more relative in that they may change whenever an audio object has sound inserted or deleted. It is to be noted that not all synch labels are for system synchronization, but may be used simply as prompts to enable the user to insert other sound or material in the audio track.

The comments column is used to identify musical pieces, sections, highlights, and to enter voice portions or written scripts. Thus, as cursor 22 scrolls downwardly in the audio editor table in time with line-by-line music play, the user is enabled to know when to commence insertion of voice-over portions. In addition, the exact script is highlighted by cursor 22 as it scrolls downwardly.

The rightmost columns in the audio editor table enable the control of the sound's volume and duration time. The method column only accepts the entry "volume". A user may key this in, or select it from the prompt list (see FIG. 11). During play of audio, this column enables a volume change according to the parameters noted in the two columns to the right (volume and time). As shown in FIG. 11, (leftmost portion), the sound volume can be varied from zero percent to 100 percent and the time that it takes to move between volumes is indicated by the amount of time in the "time" column. Thus, a volume change can occur immediately (zero seconds), or can take up to ten seconds to change from one volume to another volume. The volume adjustments do not permanently affect the digitized sound unless the user elects to have them do so, in which case the user invokes the "mix" action from action bar 20 and further selects the "permanent sound mix" listing thereunder.

The screen display of the audio editor table may be divided into top and bottom sections, when set for a dual view of audio objects A and B (not shown). The top section scrolls audio object A, and the bottom section scrolls audio object B. The active cursor may be moved back and forth between the two sections via a cursor toggle action. When the active cursor is highlighted in one section of the split screen, the other section (the other object) has an "echo cursor" which tracks along in synchronization. When the object with the active cursor is scrolled, by simply moving the cursor or performing an action such as, play, record, insert, etc., the other screen's cursor is normally scrolled in synchronization. This, thus enables the two audio objects to be mixed by the user viewing these screens for synchronization and control purposes.

Turning now to FIGS. 11, 12 and 13 the pull-downs associated with the actions in action bar 20 will be briefly considered. The Prompt action has been described above under the Audio action. A pull-down displays a plurality of play commands which enable the playback of either an entire audio piece or a portion of a piece, the repeat of a piece or a specific time segment of a piece. For instance, the Play command causes the playing of an audio object starting at the current cursor location in the audio table. As play progresses, the highlight cursor keeps pace through the audio table, line by line. Lines with no sound associated with them (comment only lines) are skipped over. Play continues until either an escape key is depressed or the last line of audio is reached. The re-record entry in the Audio action pull down enables additional recordings to be made of audio objects.

Edit actions, as indicated in the associated pull-down, enable a reversal of the last entry (undo) that affected the audio. The copy, lift and paste functions require the use of a buffer to temporarily store the material being altered while it is being operated upon, in accordance with the desired stated function. For instance, the paste command takes material from one portion of the table and puts it in another portion of the table. In Lift, the block to be "lifted" is placed in the buffer and is deleted from the audio table.

The remaining functions shown in FIGS. 12 and 13 are employed to enable alteration of the entries in the audio editor table for the purpose of creating a continuous audio object which can either be played alone or combined with a story as an integrated presentation.

As shown in FIG. 12, the Mix, Controls and Print actions in action bar 20 enable various mixing functions to be carried out between A and B sound sources; enable various controls to be "manipulated" with respect to sound volume and balance; and enable the printing of all or a portion of the audio editor table. In FIG. 13, the File, Exit and Help actions respectively enable the writing to disk of one or more audio selections; the exiting from the program upon certain conditions and the accessing of help subroutines which enable the user to overcome encountered problems.

AUDIO AUTHORING

Figure 15:
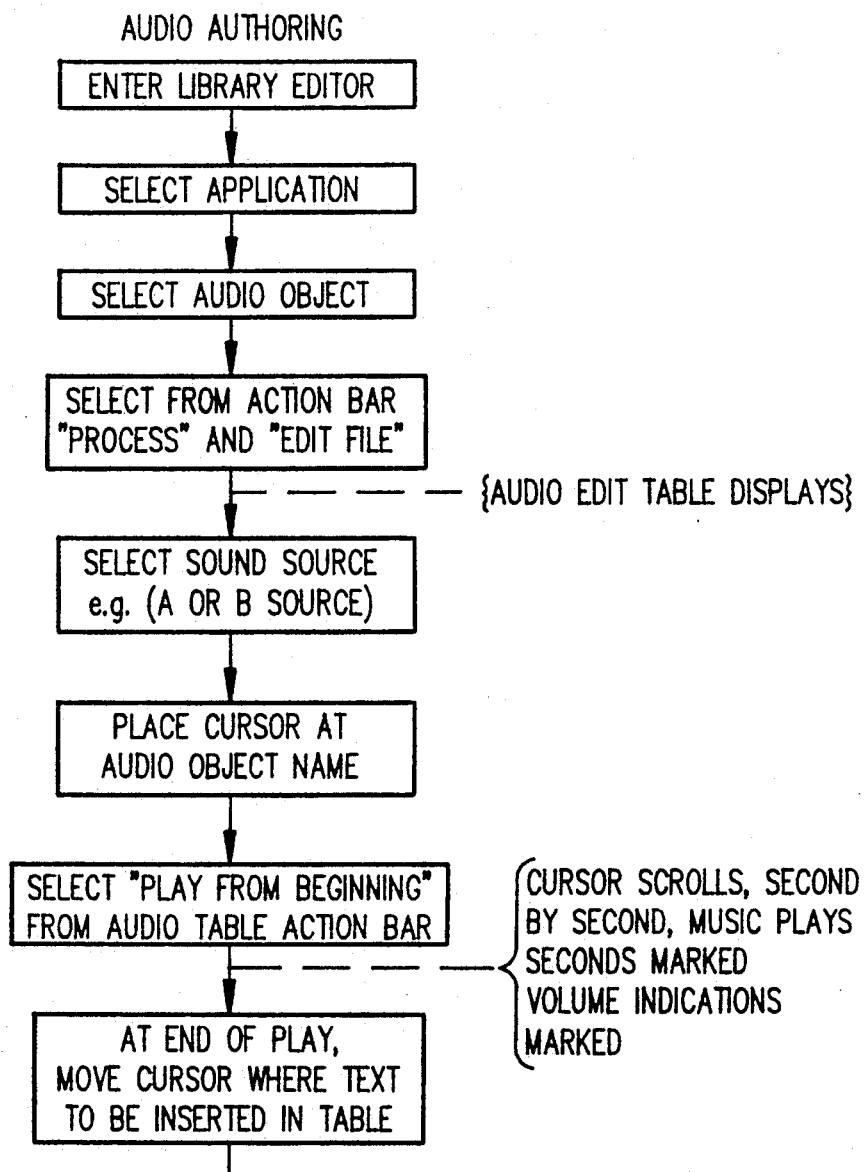
FIG. 15 and 16 are high level flow diagrams helpful in understanding the user/system interactions required to produce the table of FIG. 14.
Figure 16:
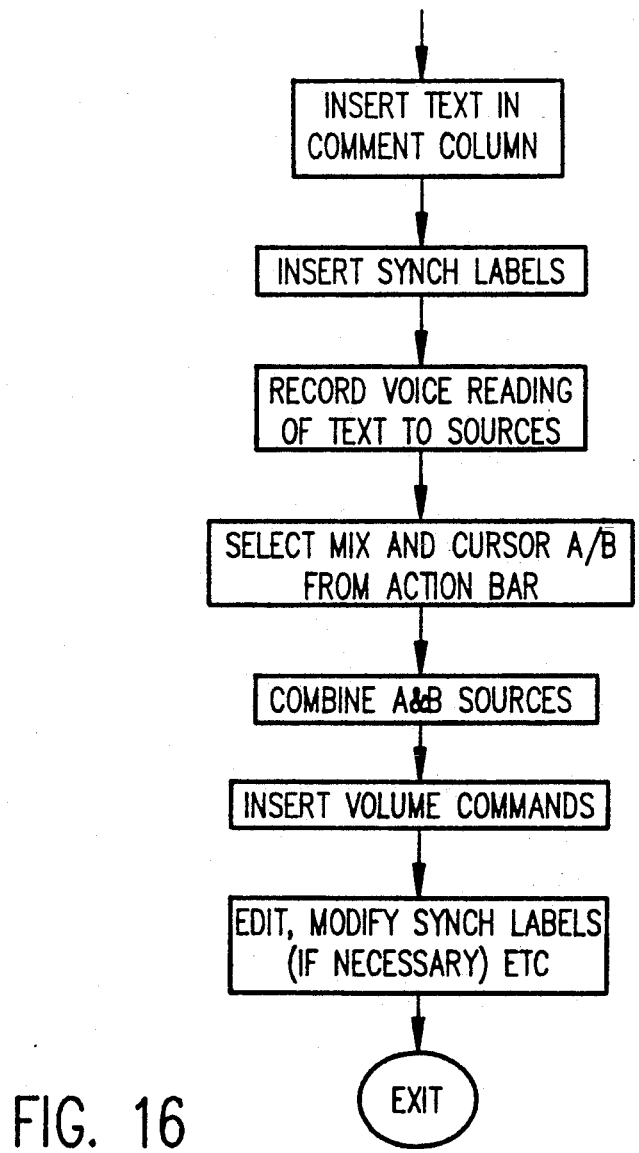

Referring now to FIGS. 14, 15, and 16, the preparation of an audio editor table for an actual presentation will be described. As shown in the flowchart of FIGS. 15 and 16, the user initially enters the library editor; selects an application, and then selects an audio object. The Process action in the action bar is then selected and the associated pull-down appears with the "edit file" function indicated. That function is selected and causes the audio edit table to be displayed. At this stage, the user selects the sound source (either A or B channel), places the cursor at the audio object name in the table and invokes the Audio action bar and its associated pull down appears (see FIG. 11). By then placing the cursor at "play" from beginning and depressing the Alt and G keys, playing of the audio object commences.

At the beginning of the audio object play, the audio editor table is the blank table as shown in FIG. 10. As the audio object commences play, cursor 22 begins to scroll, on a second by second basis, down the table. The music then plays in second by second increments, the seconds are sequentially marked and volume indications of the sound are inserted in the sound column.

All of the above actions are noted in the audio table—see FIG. 14 where an example of an actual presentation is shown. Wherever there is no sound, three dashes are inserted in the play time column. (Some of the seconds indications have been removed from the chart of FIG. 14 for brevity's sake.) The music chosen to play is "Anchors Away" and is enabled to play for 22 seconds as an introduction to commentary. At the 20 second time line, an insert is made to the sound control columns to indicate that the volume is to decrease to 20% over a two-second period. Play then continues at the 20% level until the termination of the piece or an earlier time (e.g. second 42).

At the end of the audio piece, the user moves the cursor to where the voice over text is to be inserted. The text may then be typed into the comment area or it can be directly recorded. Additionally, synch labels may be inserted in the synch label column for the purpose of user prompting or to provide a control signal for a story editor table (described below). In FIG. 14, at second 34 it is desired to cause a specific "show" to occur, synchronized with the inserted commentary. Thus, a synch label NORD is inserted which can then be referenced by the story editor table as a control function. The remaining synch labels are prompts for the user to know when certain actions are to take place during the running of the audio table. For instance, the term "fleet" is the cue to commence the recording of the first comment line shown in the comment column. The subsequent label "shore party", enables the user to know that a picture of a group of sailors will be shown at this point during the presentation.

As shown in FIGS. 15 and 16, once the synch labels are inserted, volume commands can also be inserted and the voice-over recorded in the audio B area. Subsequently, the A and B audios can then be mixed to create a single audio record and the synch labels and volume commands modified, if necessary, to cause the correct balance of sound between the background music and the voice-over.

STORY EDITOR

Story editor is used to assemble audio/visual presentations (i.e. a story). A story defines the sequencing and display of images and the synchronization of the audio. Data input from the keyboard and data outputs to the screen and to files are also controlled by the story editor. To build a story, story editor employs an authoring language called AVA (Audio/Visual Authoring language) and a specification table that is very much like that used with PC Storyboard. The AVA language adds an interactive and data processing capability to the invention that was not available in PC Storyboard. Overall, the AVA language has some 60 instructions available for use. A listing of the AVA statements, functions and commands is illustrated in FIGS. 40, 41 and 42. It should be noted that the AVA language is largely based on REXX, (Restructured, Extended Executor) a command language used in IBM products. That language is defined in "System Product Interpreter Reference", Second Edition, Dec. 1984, IBM publication number SC245239-1.

When displaying images in the story, either the entire image can be displayed all at once or just a portion. Timing specifications in the story control how long images display, how long the transition takes from one image to another, and synchronization between images and audio. Synchronization originates with the audio editor, to which the story editor responds. Stories can be set to test, at run time, for the occurrence of an event e.g. a user's actuation of a cursor field. Such fields are defined on images (such as around icons or key text words) and result in a special indication when selected by a cursor or mouse at story run-time. In this fashion, a screen of icons can be displayed for selection and upon user response, the story can determine which icon was selected and then act (i.e. branch) accordingly.

Referring now to FIG. 17, a story editor table (no. 1) is illustrated. In FIG. 18, story editor table No. 2 is illustrated and it will be noted that only the right-most four columns differ from that of table 1. In essence, the story editor table is comprised of 11 columns; however only 7 columns can be shown in one display screen, while the remaining four columns need to be relegated a second screen (FIG. 18). Each column of the story editor table has assigned to it, a preset number of character positions. Ordinarily, entry of data in one column is restricted to the preset number of assigned characters. If an attempted entry is made of a greater number of characters, the "overage" characters are neither displayed nor accepted. If it is desired to insert a statement or comment which exceeds the number of character positions available in any column, the insertion of a slash followed by an asterisk in the first two character positions of a line overrides all subsequent column character limitations and enables text to be inserted for the full length of the line.

To enable ease of movement between columns, tab codes are emplaced at the first character position of each column so that by depression of a tab key, the cursor can be incremented across a line on a table from the first character position of a column to the first character position of the next column etc. If however, the cursor is in the first character position of the right-most column (size) of the table shown in FIG. 17 and the tab key is pressed, the table shown in FIG. 18 is automatically displayed in place of table of FIG. 17. It is to be noted that the left-most two columns of both tables are identical.

The story editor tables shown in FIGS. 17 and 18 utilize a cursor which is represented by a bright flashing underscore that appears under whatever character position the cursor is currently located at. In addition, a color band entirely fills the background of the field within a line being addressed. In many cases, a column and a field are synonymous. For example, if the cursor is in the time column, only that field on the current line has a background color bar. When the current line is an AVA statement type line, the background color bar extends across the entire color line i.e., across all columns, as such a statement is enabled to extend across the entire line in one continuous string.

As above stated the story editor table uses a two section screen since the story table is too wide to fit on a single screen. The screen shown in FIG. 17 is the one normally displayed. The right four columns shown in FIG. 18 are used when working with display coordinates of partial image portions. As above stated, when the table of FIG. 17 is displayed, and the cursor is in the right most column (SIZE column) the depression of the keyboard tab key to cause the cursor to move to the initial character position of the next column in the story table (IMAGE, X, Y) simultaneously causes the screen to change to display the table shown in FIG. 18. The action also occurs when a last character entry in the size column is followed by a right arrow key depression causing the next column filed to be ready for data input.

Whenever the story table is displayed, the table is enabled for entry. Thus, wherever the cursor is positioned at the moment, the depression of a character key on the keyboard causes that character to be inserted at that spot. The left-most column (Statement) will contain one or more commands from the AVA language. If the line is a screen-type line, the commands will generally be one of show, paste, clear or color. If the line being inserted into the table is an audio type line, the command will generally be play. These commands can be seen in FIG. 42 along with the other AVA commands available for use in the system. If a command is inserted in the Statement column, followed by the name of an image, it is that image which is commanded to be displayed. The clear command causes the screen to go to black and the paste command, followed by an image name causes one image to be superimposed over a previously shown image. The play command for a sound type line causes an audio object, whose name follows the command, to be played.

Along the top of the columns in the story editor tables, there are two lines, one labeled "screen" and the other "sound". Depending upon the particular command found in the Statement column, one or the other of the screen or sound lines is enabled. Thus, if a play statement exists in the Statement column, it is the sound line which is active, whereas if a show statement is present in the Statement column, the screen line is active for the line on which the show command is emplaced.

For lines where screen type statements are present, the Method column determines the dissolve technique used to bring the image referred to in the current line onto the screen. An entry to this field, and to the remaining fields in the story editor table can be keyed in, rotated in, or selected from the pull-down list shown in FIG. 19. As will be seen from a review of the various methods of display, a number of techniques are available to cause a picture to move on or move off a screen. For instance, the checker method involves the current image being brought onto the screen in a series of random boxes in a checkerboard appearance. The explode method causes the current image to be unfurled onto the screen in four directions simultaneously, etc.

The Dir column determines the direction of a dissolve method e.g. up, down, right, left, etc. (See FIG. 20). The next column to the right i.e. Line, provides a color line along an incoming edge of the current image to separate it from the prior image that is being overlayed or moved off the screen. This entry enables the color of that line to be chosen. The Time column entry determines the amount of time the dissolve method is to take from the start of the display to its completion. The time values which can be chosen are shown in FIG. 22 and vary from immediate to 8 seconds.

The Wait entry column determines the amount of time that processing is to wait, after completion of a current dissolve, until it advances to the next story line. Wait values can be a time value (in seconds and tenths of seconds), an audio synchronization label or time indication, the term "input" which requires waiting for input responses, a user actuated enter signal, etc. The possible entries here are shown in FIG. 23. The term key causes processing to stop after completing the dissolve and to wait until a key (cursor or any other key) is depressed. An inserted time value causes the processing to stop for that specific length of time. Once the inserted time has expired, the processing proceeds onward to the next story line automatically. When A or B is at the start of a wait entry, it indicates to wait for an audio synchronization point, either from audio channel A or channel B. If the A or B is followed by a number, then the audio synchronization point is a time value—that many seconds or tenths of seconds into the audio file. The time value is measured from the very beginning of the audio file, not from where the audio started playing. If the A or B at the start of the wait entry is followed by a character entry instead of a numeric value, then the entry is interpreted as audio synch label. At run time, these labels are equated to time values by the story editor. Thus, waiting for an audio synch label is identical to waiting for an explicit audio time, except the user has the convenience of using a label reference instead of having to try to remember a particular time value. For instance, an entry of "A Horn" specifies a wait until the synch point in the audio file named "horn" is reached. This column enables the visual portion of the presentation to be very precisely synchronized with the audio presentation.

The next column i.e. Size, determines whether the dissolve method image for the image object named on the current line is to be full screen or only for a part of the screen. As shown in FIG. 24, two choices are available i.e., full or part. If part is chosen, then entries are required in one or more of the three rightmost columns in FIG. 18. Image X, Y column determines where the upper left corner of the partial display area is to come from off the current image. For example, an X, Y entry of 20, 30 would position the upper left corner of the partial view at a position 20% across the screen from the left edge and 30% down from the top edge. Entries in the WDTH, HGHT columns work exactly in the same fashion as is used for the Image X, Y coordinates. The difference is that these coordinates define the Width and Height respectively of the partial area. For example, an entry such as 30, 40 defines a partial area that is 30% of the screen size wide and 40% of the screen size in height. These dimensions are relative to the upper left corner of the partial area defined in the Image X, Y column. The Screen X, Y column works in the same fashion as used for the Image X, Y coordinates. The difference here however is that these coordinates define the upper left corner where the partial area is actually to be displayed on the screen. For example, an entry such as 80, 60 defines a partial target area that has its upper left corner, X coordinate at a position 80% across (from the left edge) and its upper left corner, Y coordinate 60% down from the top of the screen.

As can now be seen, for a screen type line, entries in the columns of the story editor table enable the method of presentation image to be totally defined, including its method of presentation and dissolve, its duration of presentation, etc. Similar entries, where a sound-type line is present, enable a sound object to be accordingly edited.

For a sound type line, the Method column has three possibilities, fade in, fade and fade out (shown in FIG. 28). The term "fade", fades up the sound at its inception and fades down the sound at its completion. "Fade-in" just controls the commencement portion of the sound, and "fade-out" controls the termination portion of the sound. The channel column enables selection of one or the other of channels A or B (see FIG. 29). The Volume column enables an entry (FIG. 30) to be inserted (for a play statement) to set the volume level for the respective play activity. The Time column entry (for sound type lines) determines the amount of time the audio dissolve methods of fade, fade in or fade out take. As shown in FIG. 31, a number of adjustments are available to these presentation methods. The Wait column entry determines the amount of time that processing is to wait after completion of a current play statement, until it advances to the next story line. Wait values can be a time value, in seconds, etc., an audio synchronization point, the term INPUT (which requires waiting for input responses and an entry actuation), the term TRIGGER which defines waiting for a cursor field to be activated etc.. The Wait column functions are similar for sound type lines as for screen type lines and operate much the same as described above for screen type lines.

The Size column entry determines whether the playing of an audio file is to be from the very start to the very end of the file (full), or whether the playing is to start and end at other points in the file (part), (see FIG. 33).

The Sound Beg column entry applies only to a play statement such as PLAY followed by the name of an audio object. It allows the specific start point to be designated—one that can be other than the start of the audio file. The entry may be an audio file synch label or a time in seconds and tenths of a second. The Sound End entry works in exactly in the same fashion as for Sound Beg except it designates where to stop playing the audio file. These are shown in FIGS. 34 and 35.

Figure 36:
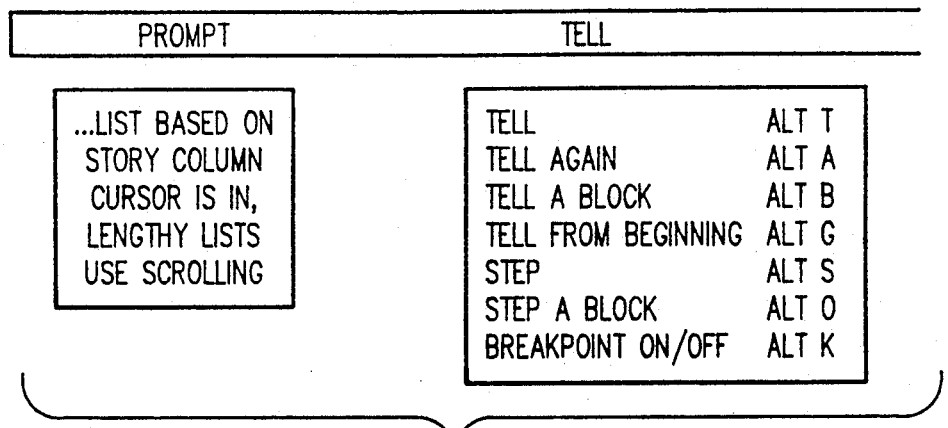
FIG. 36, is a showing of the menus which appear when either the Prompt or Tell actions are selected on the story editor table "action bar".
Figure 37:
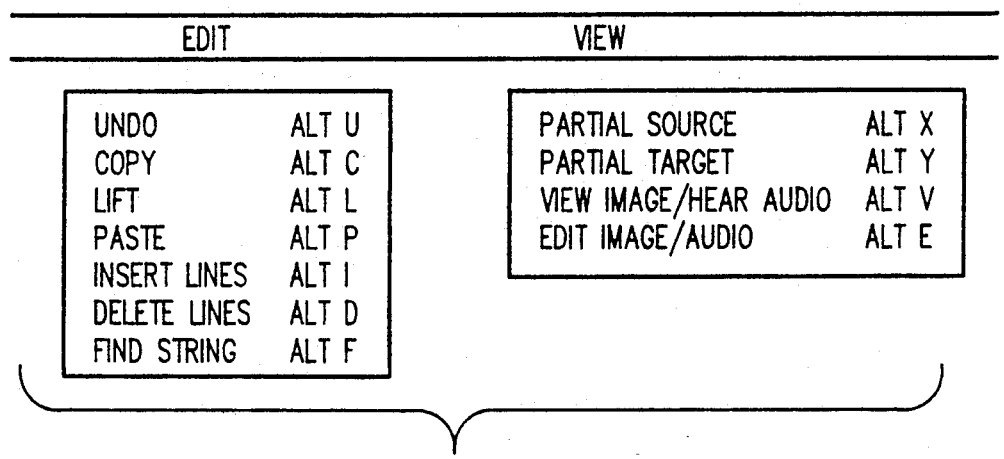
FIG. 37 is a showing of the menus which appear when either the Edit or View actions are selected on the story editor table "action bar".

Turning now to FIGS. 36-39 the various action bar functions associated with the story editor table will be briefly discussed. Many of the functions are identical to those utilized with the audio editor table. The Prompt action has been considered above and will not be further described here. The Tell action (FIG. 36), is a command which begins the telling of a story, starting at the current cursor location in the story table. Tell generally continues until the last line of the story is reached, a stop statement or break point is reached or an escape key is pressed. As soon as Tell reaches a first screen type line, it searches upwardly in the story table until it encounters a show or paste statement that has an image name associated with it. This provides the starting image display so that display of the screen-type line on which Tell resides, can be done with whatever image-to-image transition method is currently in effect for this line. Next, Tell determines what image to display for the current line. If the current line, screen-type statement has an explicit file name or variable name, then that is used. If it does not, then the same image used for the starting display becomes the display for this line. Tell then continues to sequence down the story lines executing the commands as found. The remaining Tell actions of FIG. 36 are self explanatory and will not be further described here.

The Edit actions (see FIG. 37) enable an entered story line to be altered, copied, etc. as determined by the user. The View action commands enable various portions of either a source image or target image to be selected for alteration or provide the ability to modify the image while listening to the audio or edit the image with the audio.

Figure 38:
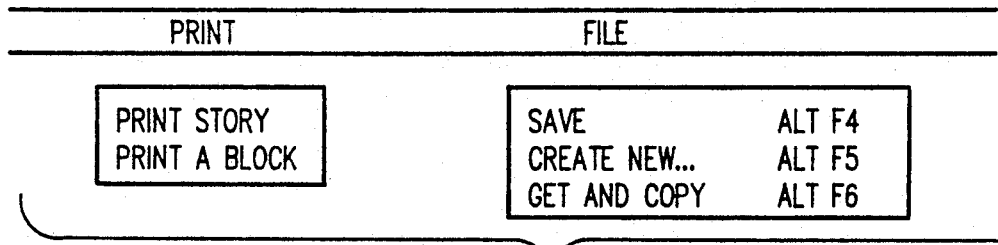
FIG. 38 is a showing of the menus which appear when either the Print or File actions are selected on the story editor table "action bar".
Figure 39:
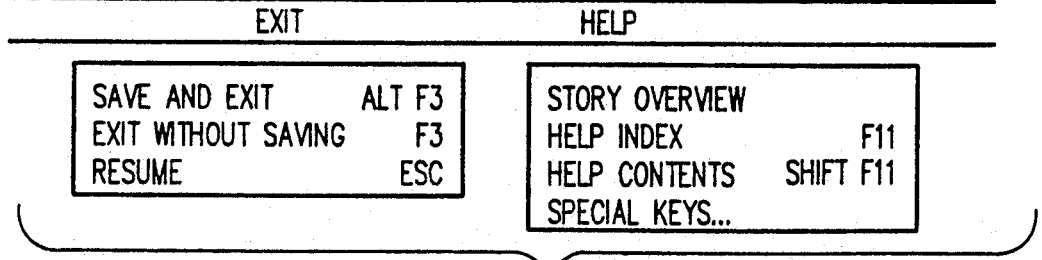
FIG. 39 is a showing of the menus which appear when either the, Exit or Help actions are selected on the story editor table "action bar".

The Print, File, Exit and Help actions shown in FIGS. 38 and 39 are further actions available to the user to perform the indicated functions.

FIGS. 40, 41 and 42 as aforestated, show the various table prompts usable in the creation of a story table. As shown in FIG. 41 and 42, a multiplicity of various functions and commands are available for insertion in the story table to enable logical and arithmetical processing to occur during the play of a story. Furthermore, these functions and commands enable interactivity to be inserted into the story, so that it awaits a user's reaction to a portion of the story before it will proceed, branch or otherwise alter its presentation.

STORY AUTHORING

Turning now to FIG. 43, a story table is illustrated which, in combination with the audio table shown in FIG. 14 enables the presentation of a synchronized audio visual presentation. Note that comments are inserted on lines 1-3 and 16-18, with the "/*" enabling the comments to overwrite the column division lines.

The story begins on line 11 of the story file with a showing of an image labelled "Intro". The column insertions on line 11 indicate that the image fades in with the fade occurring from right to left and the fade taking 0.5 seconds to occur. The full image entitled "Intro" is shown.

At line 12, a command to load the image "sailors" is executed and then, on line 13, the command to "wait" for the depression of a key is found. Upon the user depressing a key, the cursor moves to line 19, and immediately causes play to commence of the Retail 1 audio file from channel A, at 100% volume. The "A 2" entry in the Then Wait column indicates that an audio synchronization point of 2 seconds into the Retail 1 audio file is to be utilized as the time to move the cursor in FIG. 43 to line 20 and to perform the next command.

At the synchronization point A, the cursor moves to line 20 and the system executes of the command "show ALLBLACK" which image is brought to the screen using a fade which occurs over a two second interval (see time column). The ALLBACK image is held in place for 0.5 seconds and the cursor then proceeds to scroll to line 21. There the show command "navyhat" is executed utilizing a checker type of presentation to present the image, with one second then being waited until the cursor is scrolled to line 22. The "Show Sailors" command causes the "Sailors" image to be displayed using an "explode" technique, with the image coming into the center from a vertical direction. A red broader line appended to the image is commanded by the entry in the Line column, and the entry "6" in the time column indicates that it will require six seconds for the full image to be developed. The Sailors image stays in place until the 21st second of time is sensed from the A audio channel ("A 21" entry in the "then wait " column).

Story editor lines 23-26 continue as shown. At line 27, the screen goes to black utilizing a stripe presentation which occurs over 0.8 seconds. Then, the entry in the "Then, wait" column of A NORD indicates that only upon the occurrence of the NORD synchronization label from the retail 1 audio file shown in FIG. 14, will the presentation be allowed to continue. Upon that synchronization label being sensed, a logo is then shown (see line 29) utilizing a partial view as defined in the four right most columns of the story file. The presentation ends as defined in lines 30-32.

It can thus be seen that through the utilization of the audio editor table and the story editor table, a user is enabled to construct a synchronized, audio/visual presentation. Then, during run time, the PC operates to sequentially access the statements in conjunction with the playing of the audio file to present the story.

It should be understood that the foregoing description is only illustrative of the invention. There is alternatives and modifications can be devised by those skilled in the art without departing from the invention. Accordingly, the present invention is intended to embrace alternatives, modifications and variances which fall within the scope of the appended claims.

We claim:

1. In a computer/software system including a display for enabling a user to create a synchronized audio/visual story, said system including an audio presentation editor screen, the method of creating and displaying an audio presentation program on said screen comprising the steps of:
   (a) displaying, for an audio sound track, continuing discrete time of play indications along one dimension of said editor screen;
   (b) inserting synchronization labels adjacent said time-of-play indications on said audio presentation editor screen when visual displays are to be shown;
   (c) employing said synchronization labels to provide control signals, such control signals operating to enable performance of visual display presentation commands; and
   (d) enabling edit functions on said audio sound track through user-interactive commands displayed on said screen. said time of play indications being altered upon any insertion to or deletion from said audio sound track.

2. The method of claim 1 further including the step of:
   (e) inserting volume control indications in said screen to modify the volume of said audio sound track.

3. The method of claim 2 further comprising:
   (f) inserting narrative text adjacent user selected time-of-play indications on said screen.

* * * * *